United States Patent
Erimli et al.

(10) Patent No.: US 6,842,423 B1
(45) Date of Patent: Jan. 11, 2005

(54) SYSTEMS AND METHODS FOR PRIORITY-BASED FLOW CONTROL MASKING

(75) Inventors: Bahadir Erimli, Campbell, CA (US); Yatin R. Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 846 days.

(21) Appl. No.: 09/846,284

(22) Filed: May 2, 2001

(51) Int. Cl.$^7$ ................................................ H04L 12/56
(52) U.S. Cl. ...................... 370/235; 370/389; 370/418
(58) Field of Search ................................. 370/229, 230, 370/231, 235, 236, 389, 412, 417, 418, 428, 429; 709/232, 235, 238, 240; 710/29, 36, 40

(56) References Cited

U.S. PATENT DOCUMENTS

| | | | |
|---|---|---|---|
| 5,724,358 A | * 3/1998 | Headrick et al. | ........... 370/418 |
| 5,870,396 A | * 2/1999 | Abu-Amara et al. | ........ 370/413 |
| 6,094,435 A | * 7/2000 | Hoffman et al. | ............ 370/414 |
| 6,487,212 B1 | * 11/2002 | Erimli et al. | ................ 370/413 |
| 6,707,824 B1 | * 3/2004 | Achilles et al. | ............. 370/412 |
| 2002/0087723 A1 | * 7/2002 | Williams et al. | ............ 709/240 |

* cited by examiner

Primary Examiner—Alpus H. Hsu
(74) Attorney, Agent, or Firm—Harrity & Snyder, LLP

(57) ABSTRACT

A system provides flow control in a network device. The system includes output queues that correspond to the output ports of the network device, a mask register, a first logic device, and a second logic device. Each of the output queues generates signals relating to the priority levels associated with the corresponding output port when at least a predetermined number of items are stored in the output queue. The mask register generates mask signals relating to the priority levels associated with a particular one of the output ports. The first logic device generates first flow control signals related to the priority levels associated with the particular output port based on the signals from the output queues and the mask signals associated with the priority levels and the particular output port. The second logic device generates a second flow control signal based on the first flow control signals from the first logic device. The second flow control signal may be used to control a flow of packets at the particular output port.

24 Claims, 5 Drawing Sheets

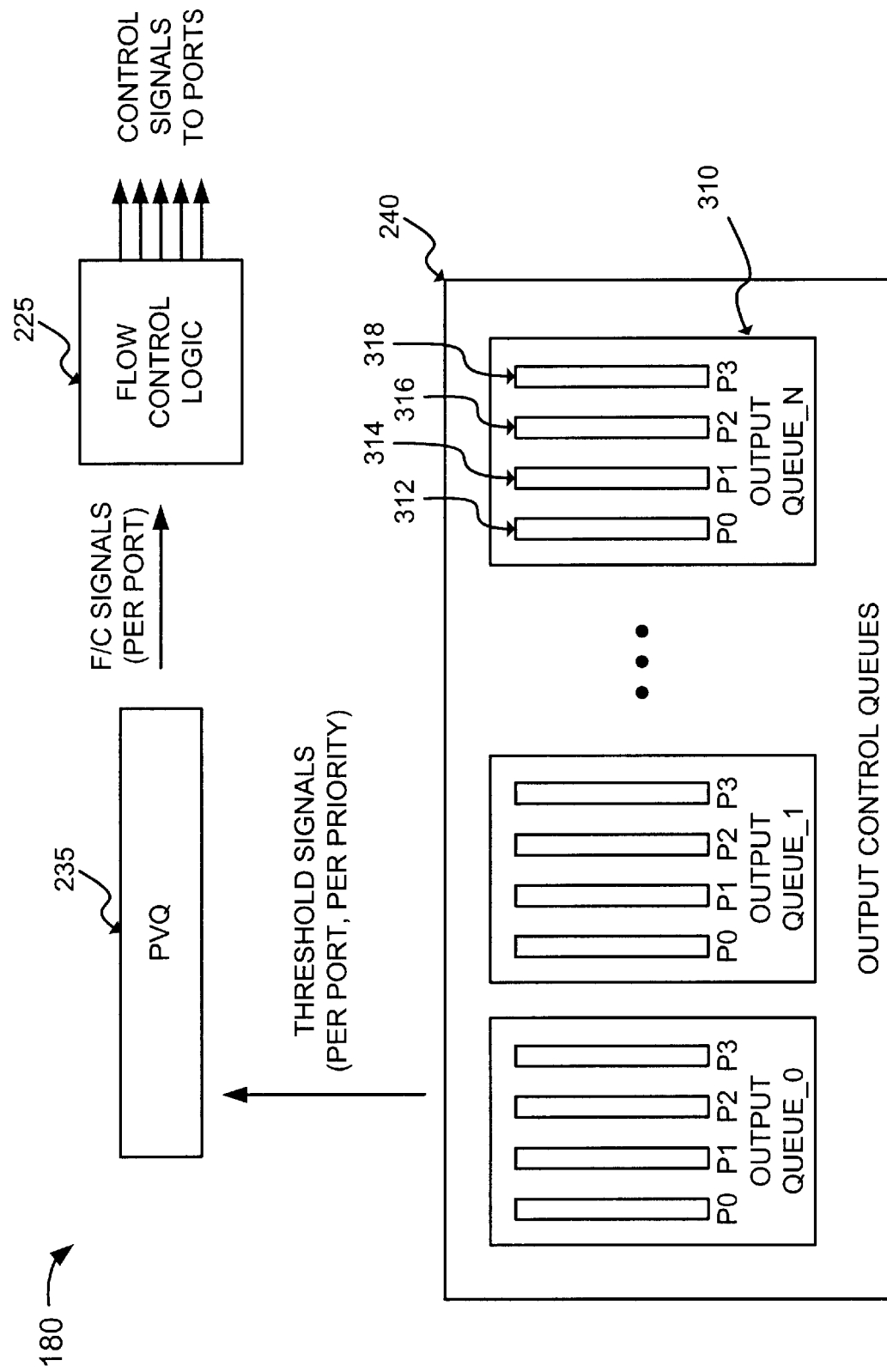

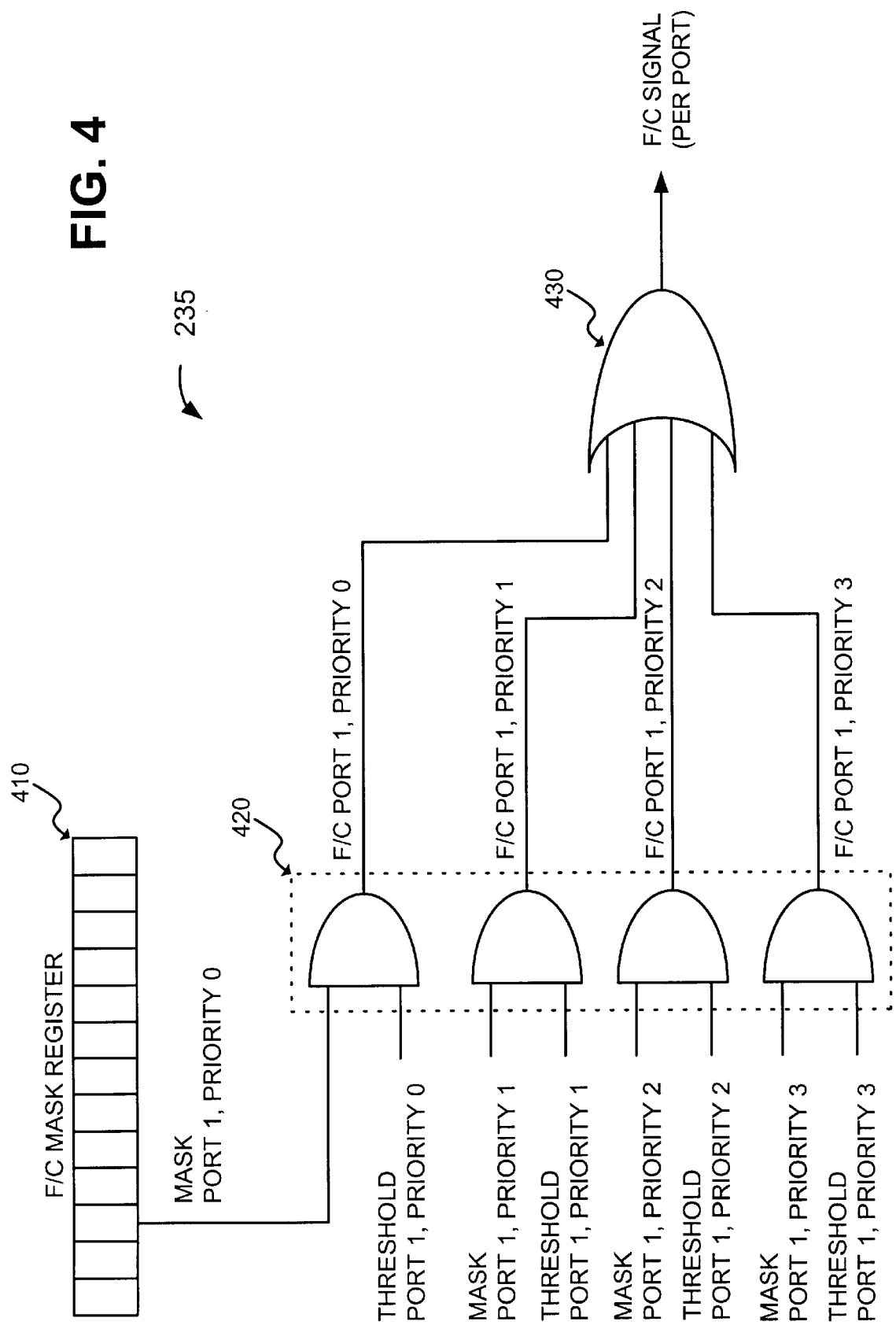

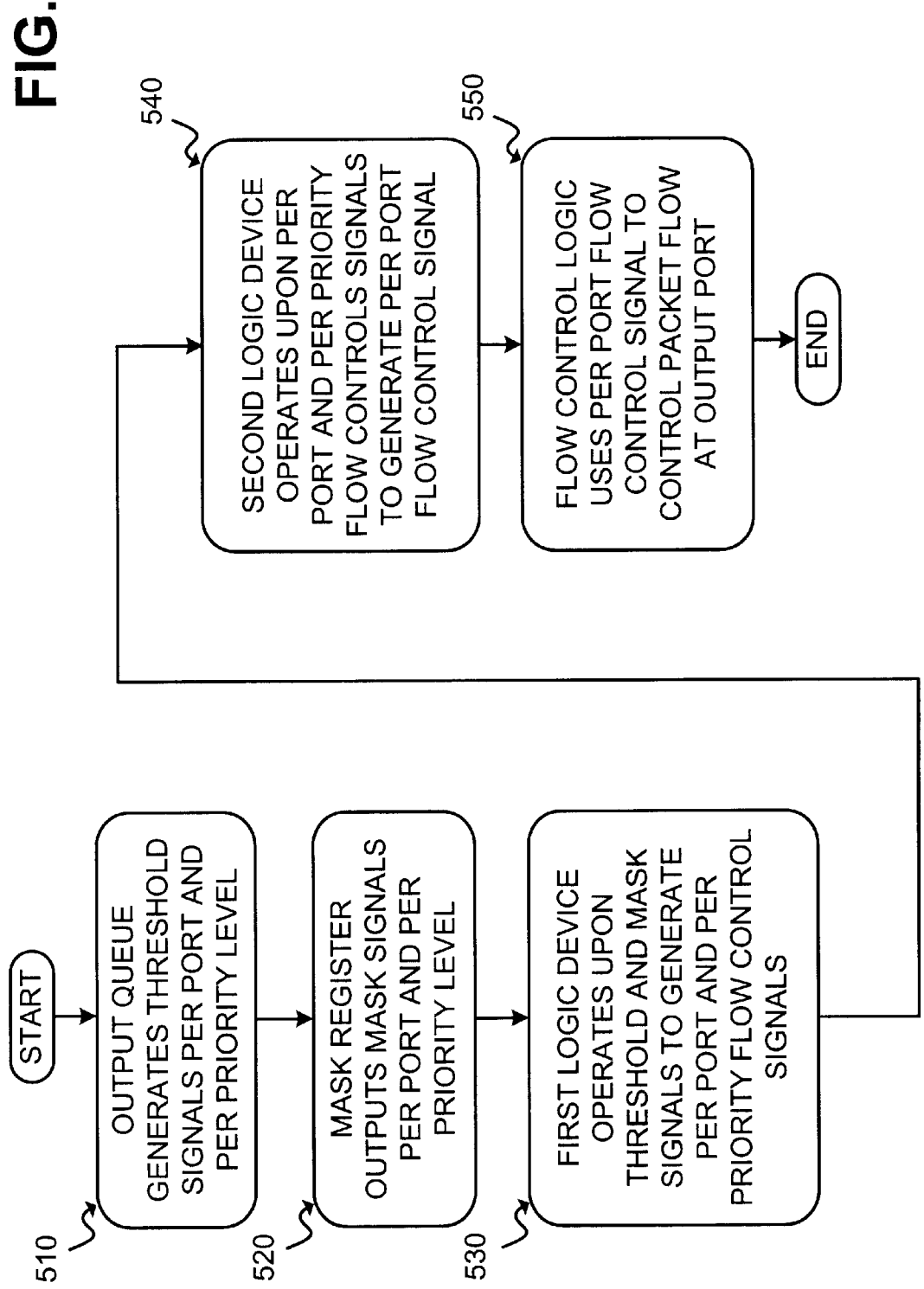

SYSTEMS AND METHODS FOR PRIORITY-BASED FLOW CONTROL MASKING

TECHNICAL FIELD

The present invention relates generally to communication systems and methods and, more particularly, to systems and methods for masking certain priorities to prevent other priorities from being flow controlled.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of packets and includes logic for receiving and forwarding packets to their appropriate destinations.

When congestion occurs in a conventional network switch, the switch typically takes some measures to prevent further congestion, such as dropping packets. To this extent, conventional switches usually employ flow control techniques to minimize the congestion in the switch. Flow control techniques may also be used for quality of service controls.

Conventional flow control techniques control the rate or volume of packets transmitted by the switch on a per-port basis. As a result, these techniques unnecessarily flow control all packets transmitted by a particular port even when a single flow (i.e., a series of packets or data frames belonging to a certain host and destination pair or belonging to a certain transport session between any two hosts) causes the congestion at the port.

DISCLOSURE OF THE INVENTION

There exists a need for systems and methods that masks certain priorities to prevent other (possibly higher) priorities from being flow controlled. Systems and methods consistent with the present invention address this and other needs by providing priority-based flow control masking at the output ports of a network switch. This improves the efficiency and throughput of the network switch.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a network device that controls the flow of packets. The network device includes output queues that correspond to the output ports of the network device, a mask register, a first logic device, and a second logic device. Each of the output queues generates signals relating to the priority levels associated with the corresponding output port when at least a predetermined number of items are stored in the output queue. The mask register generates mask signals relating to the priority levels associated with a particular one of the output ports. The first logic device generates first flow control signals related to the priority levels associated with the particular output port based on the signals from the output queues and the mask signals associated with the priority levels and the particular output port. The second logic device generates a second flow control signal based on the first flow control signals from the first logic device. The second flow control signal may be used to control a flow of packets at the particular output port.

In another implementation consistent with the present invention, a method provides flow control in a network device. The method includes generating first signals relating to a plurality of priority levels associated with particular ones of a plurality of output ports of the network device; generating second signals corresponding to the priority levels associated with the particular output ports; using the first and second signals associated with the priority levels and the particular output ports to generate a plurality of first flow control signals related to the priority levels associated with the particular output ports; generating a second flow control signal corresponding to each of the output ports based on the first flow control signals; and controlling a flow of packets at the corresponding output ports based on the second flow control signals.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

FIG. 3 is a diagram of a portion of the multiport switch of FIG. 2 according to an implementation consistent with the present invention;

FIG. 4 is an exemplary diagram of the port vector queue of FIG. 3 according to an implementation consistent with the present invention; and FIG. 5 is a flowchart of exemplary processing for masking certain priorities according to an implementation consistent with the present invention.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
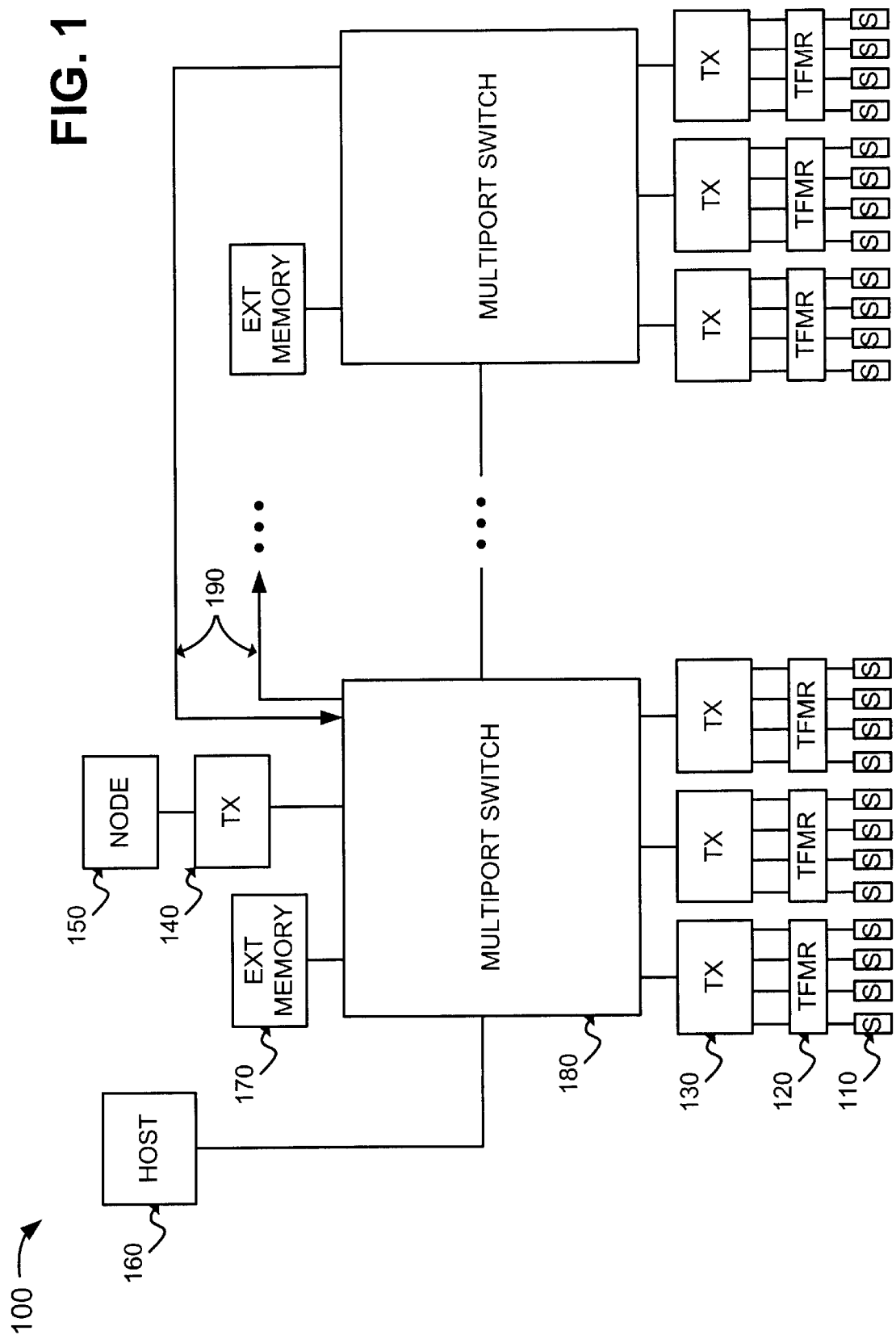
FIG. 1 is a block diagram of an exemplary system in which systems and methods consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
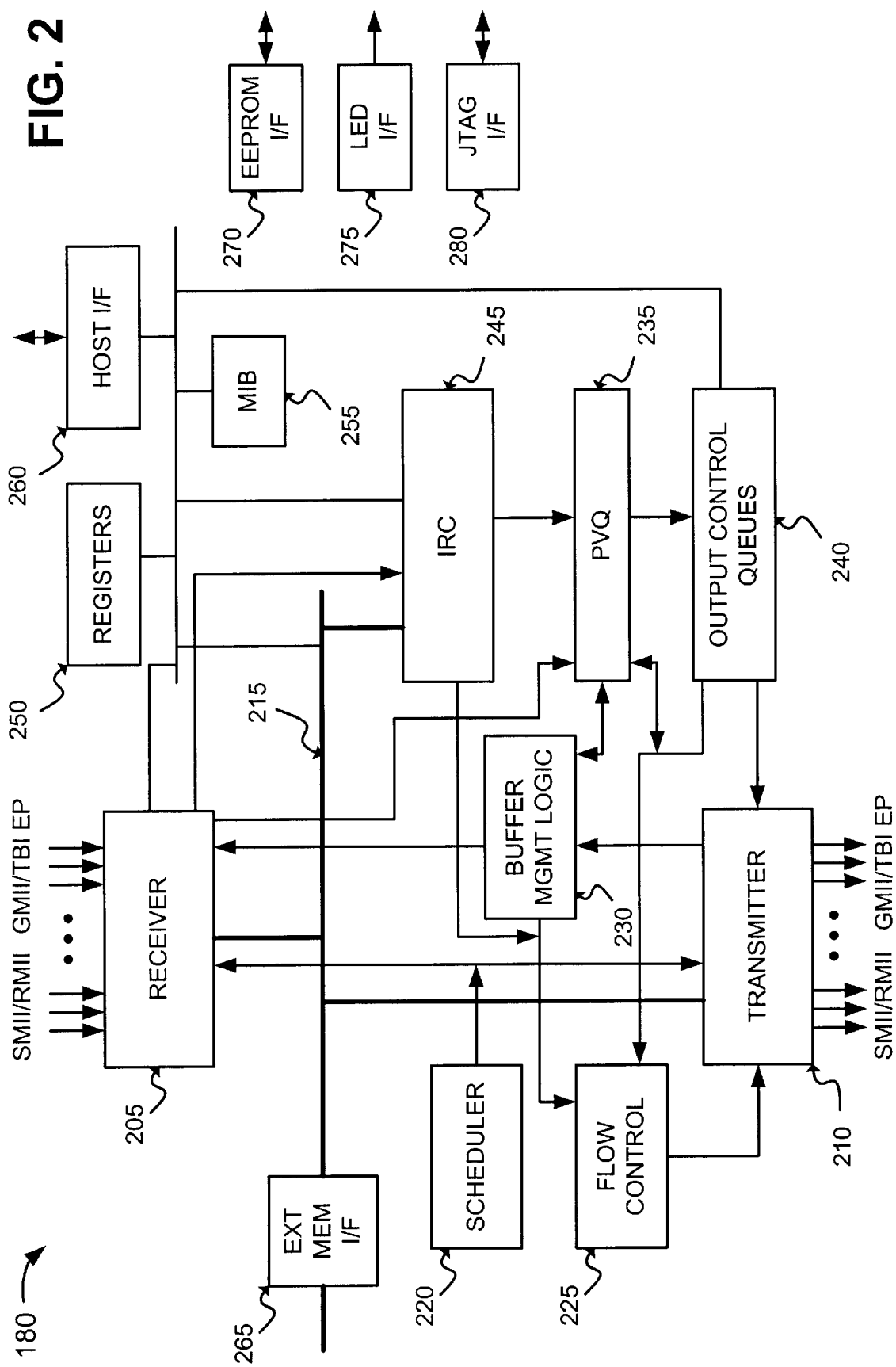
FIG. 2 is a detailed diagram of a multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, token bucket logic 238, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue.

The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes. The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Exemplary Flow Control Mechanisms

The present invention is directed to flow control mechanisms in a network device, such as the multiport switch 180, that mask certain priorities to prevent other (possibly higher) priorities from being flow controlled.

FIG. 3 is a detailed diagram of a portion of the multiport switch 180 according to an implementation consistent with the present invention. The portion of the multiport switch 180 shown in FIG. 3 includes the flow control logic 225, the PVQ 235, and output control queues 240. The output control queues 240 may include multiple output queues 310. Each of the output queues 310 may be associated with one of the output ports.

The output queues 310 may include priority queues 312–318. The priority queue 312 may store forwarding descriptors for packets of priority 0 (low priority) that await transmission from the corresponding output port. The priority queue 314 may store forwarding descriptors for packets of priority 1 (medium-low priority) that await transmission from the corresponding output port. The priority queue 316 may store forwarding descriptors for packets of priority 2 (medium-high priority) that await transmission from the corresponding output port. The priority queue 318 may store forwarding descriptors for packets of priority 3 (high priority) that await transmission from the corresponding output port. In exemplary implementations consistent with the present invention, higher priority packets take precedence over lower priority packets. Four priority queues 312–318 have been shown for simplicity. In other implementations consistent with the present invention, the number of priority queues differs.

The output queues 310 generate threshold signals that may be used to perform flow control in the switch 180. In an exemplary implementation, each of the output queues 310 has thresholds corresponding to a number of items of each particular priority. When the number of items of a particular priority in an output queue 310 exceeds the threshold, the output queue 310 generates a threshold signal. The threshold signal may include one or more bits that indicate whether flow control measures should be initiated for the corresponding output port. In other implementations consistent with the present invention, a threshold signal may relate to a measure of the number of packets (or number of bytes of packet data) that await transmission from the corresponding output port. The threshold signals may be generated on a per port and per priority basis. In other words, each of the priority queues 312–318 may generate a threshold signal, which it provides to the PVQ 235.

The PVQ 235 operates upon the threshold signals from the output queues 310 and generates flow control (F/C) signals on a per output port basis. FIG. 4 is an exemplary diagram of the PVQ 235 according to an implementation consistent with the present invention. The PVQ 235 may include a flow control mask register 410, a first logic element 420, and a second logic element 430. A single mask register 410, first logic element 420, and second logic element 430 are shown in FIG. 4. In other implementations consistent with the present invention, the PVQ 235 may include multiple mask registers 410, first logic elements 420, and/or second logic elements 430, such as one per output port.

The flow control mask register 410 may include a register that stores programmable mask signals corresponding to one or more output ports and priorities. The mask register 410 may map flow identifiers, output port identifiers, and/or priority level values to corresponding mask signals. The mask signals may be used to mask certain priorities to prevent other priorities from being flow controlled, for example, when congestion occurs at an output port. In an implementation consistent with the present invention, the mask register 410 may store mask signals for a number of priorities relating to a particular output port.

The first logic element 420 may include one or more logic devices or Boolean operators, such as AND gates for active high logic or NAND gates for active low logic, that operate upon mask signals from the mask register 410 and threshold signals from the output queues 310. In an implementation consistent with the present invention, the first logic element 420 may include multiple logic devices that each generate a flow control signal associated with a particular output port and priority level. In this implementation, the mask signal and the threshold signal operated upon by a particular logic device relate to the same output port and priority level.

The second logic element 430 may include a logic device or Boolean operator, such as an OR gate for active high logic or a NOR gate for active low logic, that operates upon the flow control signals from the first logic element 420. The second logic element 430 may generate a flow control signal associated with an output port. The output port is the output port common to the flow control signals from the first logic element 420.

Returning to FIG. 3, the PVQ 235 may send the flow control signals to the flow control logic 225. The flow control logic 225 may use the flow control signals from the PVQ 235 to generate control signals for controlling the flow of packets from the output ports.

Exemplary Processing

FIG. 5 is a flowchart of exemplary processing for masking certain priorities according to an implementation consistent with the present invention. Processing may begin with the priority queues 312–318 of the output queues 310 generating threshold signals [act 510]. As described above, the threshold signals may indicate whether flow control measures should be initiated for the corresponding output port. In particular, a threshold signal from a priority queue 312–318 may indicate whether flow control measures should be initiated for packets of this priority level. Flow control measures may be initiated, for example, when congestion occurs at the output port for packets of a particular priority level. The flow control measures may include, for example, dropping packets or downgrading packets to lower their priority levels.

The PVQ 235 receives the threshold signals from the output queues 310. The mask register 410 within the PVQ 235 may generate mask signals on a per output port and per priority level basis [act 520]. The mask register 410 may map flow identifiers, output port identifiers, and/or priority level values to corresponding mask signals. The mask signals may be used to mask certain priorities to prevent other priorities from being flow controlled, for example, when congestion occurs at an output port.

The first logic device 420 may receive the threshold signals associated with the different priority levels of a particular output port and the mask signals corresponding to the same output port. The first logic device 420 may operate upon these signals to generate per output port and per priority flow control signals [act 530]. In an implementation consistent with the present invention, the first logic device 420 may AND (or NAND) each pair of threshold and mask signals to generate a flow control signal associated with a particular output port and a particular priority level.

The second logic device 430 may operate upon the per output port and per priority flow control signals from the first logic device 420 to generate a per output port flow control signal [act 540]. For example, the second logic device 430 may OR (or NOR) the flow control signals associated with different priority levels of a particular output port to generate a flow control signal for the output port.

The flow control logic 225 may use a flow control signal associated with an output port to control the flow of packets at the output port [act 550]. For example, based on the flow control signal, the flow control logic 225 may initiate flow control measures to alleviate congestion at the output port by dropping packets, downgrading packets to lower priorities, etc.

As an example, assume that switch 180 wishes to disable flow control at output port 1. In this case, the mask register 410 may be programmed such that the mask signals associated with port 1 are all set, for example, to a logic low level (e.g., zero). Therefore, each AND gate, for example, in the first logic device 420 may generate a logic low signal regardless of the state of the per priority threshold signals. The second logic device 430 may then output a logic low flow control signal based on the logic low signals from the first logic device 420. The flow control logic 225 may use the logic low flow control signal from the second logic device 430 to disable flow control for the corresponding output port.

Described has been systems and methods for masking certain priorities to facilitate the providing of flow control measures by the multiport switch 180. By doing so, the systems and methods consistent with the present invention may maximize the efficiency and throughput of the multiport switch 180.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, while a series of acts has been described with regard to FIG. 5, the order of the acts may differ in other implementations consistent with the present invention.

Also, the first logic device 420 and the second logic device 430 have been described as including AND or NAND gates and an OR or NOR gate, respectively. In other implementations consistent with the present invention, the first and second logic devices 420 and 430 may include other types of devices or software for generating flow control signals.

What is claimed is:

1. A system for providing flow control in a network device, comprising:
   a plurality of output queues corresponding to output ports of the network device, each of the output queues generating signals relating to a plurality of priority levels associated with the corresponding output port when at least a predetermined number of items are stored in the output queue;
   a mask register configured to generate mask signals relating to the priority levels associated with a particular one of the output ports;
   a first logic device configured to generate a plurality of first flow control signals related to the priority levels associated with the particular output port based on the signals from the output queues and the mask signals associated with the priority levels and the particular output port; and
   a second logic device configured to generate a second flow control signal based on the first flow control signals from the first logic device, the second flow control signal being used to control a flow of packets at the particular output port.

2. The system of claim 1, wherein each of the output queues includes:
   a plurality of priority queues, each of the priority queues being associated with one of the priority levels and one of the output ports.

3. The system of claim 1, wherein the first logic device includes:
   a plurality of first Boolean operators, each of the first Boolean operators being configured to generate one of the first flow control signals corresponding to one of the priority levels and one of the output ports.

4. The system of claim 3, wherein each of the first Boolean operators includes at least one of an AND gate and a NAND gate.

5. The system of claim 3, wherein the second logic device includes:
   a second Boolean operator configured to generate the second flow control signal based on the first flow control signals generated by the first Boolean operators.

6. The system of claim 5, wherein the second Boolean operator includes at least one of an OR gate and a NOR gate.

7. The system of claim 1, wherein the first logic device includes a plurality of first logic devices, each of the first logic devices corresponding to one of the output ports.

8. The system of claim 7, wherein the second logic device includes a plurality of second logic devices, each of the second logic devices corresponding to one of the output ports.

9. The system of claim 1, further comprising:
   flow control logic configured to control the flow of packets at the particular output port based on the second flow control signal.

10. The system of claim 9, wherein the flow control logic is configured to drop packets based on the second flow control signal.

11. The system of claim 9, wherein the flow control logic is configured to lower priority levels associated with the packets based on the second flow control signal.

12. The system of claim 1, wherein the signals from the output queues indicate whether to initiate flow control measures at the output ports.

13. The system of claim 1, wherein the signals from the output queues relate to a measure of a number of packets or bytes of packet data to be transmitted at the output ports.

14. A method for providing flow control in a network device, comprising:
    generating first signals relating to a plurality of priority levels associated with particular ones of a plurality of output ports of the network device;
    generating second signals corresponding to the priority levels associated with the particular output ports;
    using the first and second signals associated with the priority levels and the particular output ports to generate a plurality of first flow control signals related to the priority levels associated with the particular output ports;
    generating a second flow control signal corresponding to each of the output ports based on the first flow control signals; and
    controlling a flow of packets at the corresponding output ports based on the second flow control signals.

15. The method of claim 14, wherein the first signals indicate whether to initiate flow control measures at the output ports.

16. The method of claim 14, wherein the first signals relate to a measure of a number of packets or bytes of packet data to be transmitted at the output ports.

17. The method of claim 14, wherein the using the first and second signals includes:
    subjecting the first and second signals to at least one of logical AND and logical NAND operations to generate the first flow control signals.

18. The method of claim 17, wherein the generating a second flow control signal includes:

subjecting the first flow control signals to at least one of a logical OR and logical NOR operation to generate the second flow control signal.

19. A multiport network device, comprising:

a plurality of input ports configured to receive a plurality of packets;

a plurality of output ports configured to transmit at least some of the packets;

a plurality of output queues corresponding to the output ports, each of the output queues including a plurality of priority queues, each of the priority queues generating signals relating to one of a plurality of priority levels associated with the corresponding output port when at least a predetermined number of items are stored in the output queue;

a mask register configured to generate mask signals relating to the priority levels associated with a particular one of the output ports;

a first logic device configured to generate a plurality of first flow control signals related to the priority levels associated with the particular output port based on the signals from the output queues and the mask signals associated with the priority levels and the particular output port;

a second logic device configured to generate a second flow control signal based on the first flow control signals from the first logic device; and flow control logic configured to control a flow of the packets from the particular output port based on the second flow control signal.

20. The multiport network device of claim 19, wherein the first logic device is configured to subject the signals from the output queues and the mask signals to at least one of logical AND and logical NAND operations to generate the first flow control signals.

21. The multiport network device of claim 19, wherein the second logic device is configured to subject the first flow control signals to at least one of a logical OR and logical NOR operation to generate the second flow control signal.

22. The multiport network device of claim 19, wherein the signals from the output queues indicate whether to initiate flow control measures at the output ports.

23. The multiport network device of claim 19, wherein the flow control logic is configured to drop packets based on the second flow control signal.

24. The multiport network device of claim 19, wherein the flow control logic is configured to lower priority levels associated with the packets based on the second flow control signal.

* * * * *